Patented June 3, 1952

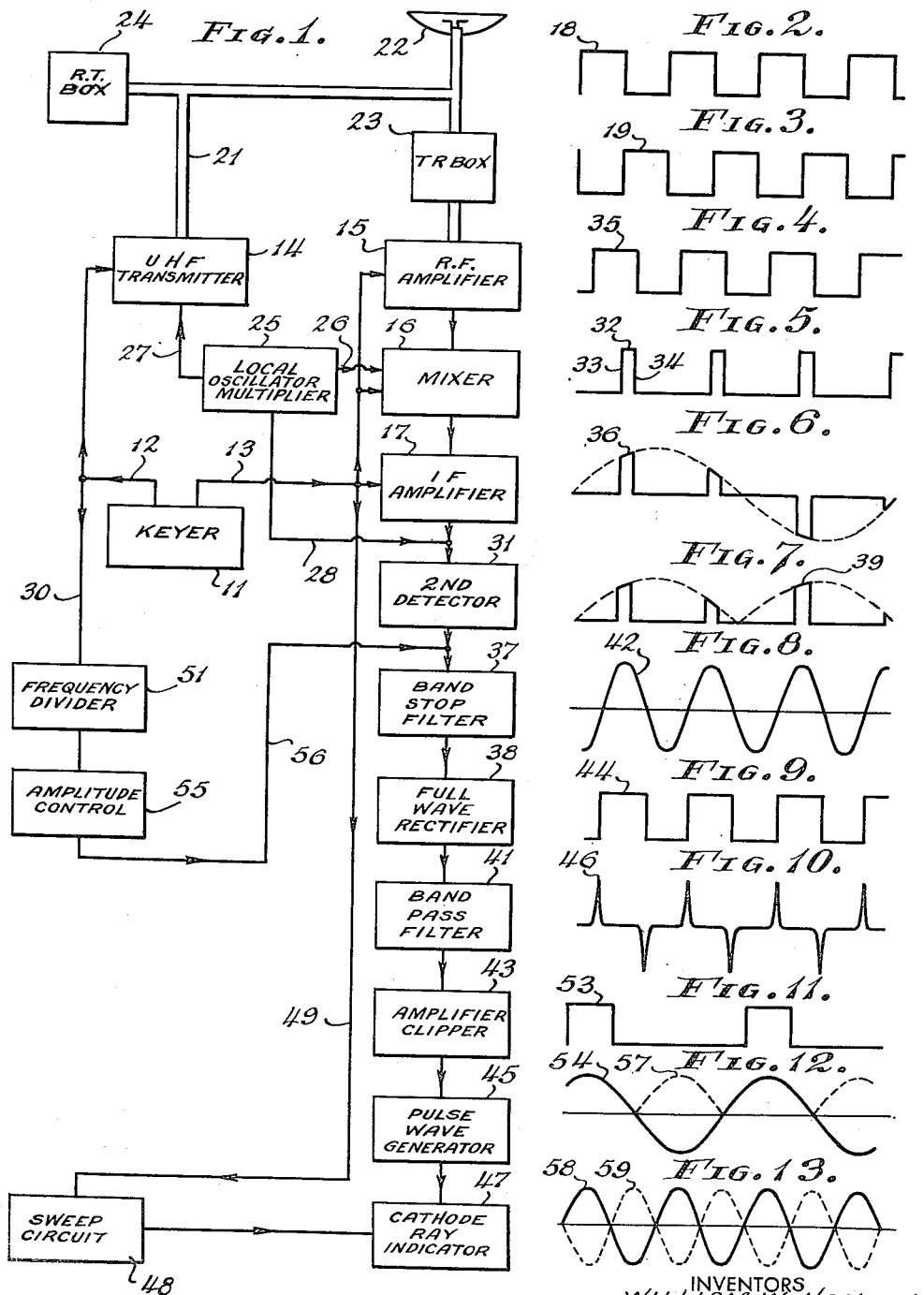

2,598,689

UNITED STATES PATENT OFFICE 2,598,689

NOISE REDUCTION SYSTEM FOR RADAR

William W. Hansen, Stanford University, Calif., and Edward J. Barlow, Rutherford, N. J., assignors to The Sperry Corporation, a corporation of Delaware Application April 19, 1946, Serial No. 663,380

6 Claims. (Cl. 343—9)

The present invention relates generally to radio receiving systems and more particularly to means for reducing noise in the indicating circuits of radar systems.

It is well known that when a reflecting object has a component of velocity relative to a radio transmitter, that portion of the intercepted radiant energy returned toward the source of radiation differs in frequency from the transmitted energy because of the Doppler effect. This frequency difference is directly proportional to both the radial velocity of the object and the frequency of the transmitted wave. The radiated and reflected waves may be mixed in a detector to produce a beat frequency or Doppler beat note revealing the presence of the moving object, and this frequency may then be measured to provide an accurate knowledge of the radial velocity of the object.

Patent No. 2,479,568, granted August 23, 1949, entitled Radio Distance Measuring System, and filed August 19, 1943 in the name of William W. Hansen, one of the present inventors, discloses a distance measuring radio system sensitive only to objects having radial components of motion relative to the radio receiver. This system comprises a radio transmitter for radiating a radio wave toward reflecting objects, a receiver for receiving radio waves reflected from the irradiated objects, and means generating a keying wave for rendering the transmitter and receiver alternately operative. A detector is coupled to the receiver for demodulating waves whose frequencies differ in accordance with the differences between the frequency of the radiated wave and the frequencies of the reflected waves. The detected signals are supplied to a band-stop filter which acts to substantially suppress detected versions of the keying wave. This results in the elimination of signals caused by stationary objects. Detected signals from moving objects, however, have frequencies differing from the keying frequency according to the radial velocities of the respective objects, and therefore these signals pass through the filter. A rectifier is provided for recreating a version of the keying wave from the modulation envelope of those signals passing through the filter when a moving object is present in the radiation path of the system. A band-pass filter is then employed to transmit only the fundamental component or possibly also the harmonics of the recreated version of the keying wave. This second filter eliminates a substantial amount of spurious noise. Finally, the phase of the recreated and filtered version of the keying wave is compared to the phase of the original keying wave to determine the distance to the moving object.

One of the primary considerations in designing an object detecting radio system is to reduce random noise and interference to an absolute minimum in order that the signal which results from the energy of minute intensity reflected back to the receiver from a moving object, such as an aircraft, be not entirely lost among the spurious signals. Although the phase indicating circuit of the above-mentioned radio system responds only to a very narrow band of frequencies, there is still sufficient noise transmitted by the narrow band-pass filter to create an undesired reduction in the sensitivity of the system.

It is, therefore, a principal object of the invention to provide means for cancelling a substantial portion of the residual noise from the indicating circuit of a radio distance measuring system.

Another object is to provide a noise reduction system for a keyed or intermittently responsive radio receiver which system acts to eliminate a periodic noise wave resulting from the intermittent operation of the radio receiver.

A further object of the invention is to provide improved apparatus and instrumentalities embodying novel features and principles adapted for use in realizing the above objects and also adapted for use in other fields.

A principal feature of the present invention is the provision of apparatus for generating a signal having an amplitude, frequency and phase such as to cancel or balance out a periodic noise wave introduced into the indicating circuit of an object detecting radio system by the intermittent operation of the receiver.

A specific feature of the invention is the provision, in an intermittently responsive or keyed object detecting radio receiver wherein a band-stop filter suppresses frequencies corresponding to the wave that keys the receiver, a full-wave rectifier recreates a version of the keying wave from those signals passing through the filter, and a band-pass filter then transmits only the fundamental component of the recreated version of the keying wave to an indicating circuit for revealing the presence of a moving object, of apparatus comprising a means for supplying a signal of one-half the keying frequency in accompaniment with the received signals to the band-pass filter which signal is then doubled in frequency by the full-wave rectifier and added in the indicating circuit to the other applied signals in such phase and amplitude as to substantially cancel a periodic noise wave present therein as a result of the keying of the receiver.

The invention in another of its aspects relates to novel features of the instrumentalities described herein for achieving the principal objects of the invention and to novel principles employed in those instrumentalities, whether or not these features and principles are used for the said principal objects or in the said field.

Other objects and advantages will become apparent from the specification taken in connection with the accompanying drawings wherein:

Fig. 1 is a block diagram of a distance measuring radio system embodying the present invention; and Figs. 2-13 are graphs of idealized wave shapes illustrating operation of the structure of Fig. 1.

In Fig. 1 the direction of control or energy flow is represented by arrows, while in Figs. 2-13 vertical and horizontal axes represent wave amplitude and time, respectively, drawn to an arbitrary scale.

The principle underlying the present invention is the realization that noise in an intermittently responsive radio receiver has a modulation envelope corresponding in shape to the response-time characteristic of the receiver. This modulation results in the generation by a non-linear circuit, such as a rectifier, of a periodic noise wave at the keying frequency of the receiver which wave has an amplitude not only dependent upon the magnitude of the desired signal but also sufficiently great to seriously impair the sensitivity of the receiver.

The essence of the invention is the provision of apparatus for producing in the indicating circuit of the intermittently responsive receiver a noise cancellation signal in phase opposition to the periodic noise wave and having an amplitude variable in unison therewith.

Referring now to Fig. 1, a keyer 11 provides substantially square waves of opposite phase over leads 12 and 13, respectively. Lead 12 is connected to an ultra high frequency transmitter 14 which is adapted to be turned on for alternate half cycles of the square wave. The lead 13, on the other hand, is connected to a radio frequency amplifier 15, mixer 16 and intermediate frequency amplifier 17 forming a portion of a receiver which is made operative by the wave on lead 13 in phase opposition with the wave controlling the transmitter, i. e., the operations of the transmitter and receiver are alternate, the receiver being insensitive when the transmitter is radiating and the transmitter being quiescent when the receiver is sensitive.

The transmitter cycle is represented by portions 18 of the keying wave illustrated in Fig. 2, while the operating cycle of the receiver is shown by portions 19 of the keying wave illustrated in Fig. 3. In practice, the receiver is not switched on until a short time after the transmitter is switched off. Likewise, the transmitter is not switched on until after the receiver is switched off. This delaying action prevents overlap between the two functions. The repetition rate is so chosen that a delay occurs during the transit time of radio propagation to and from objects at the maximum desired range equal to approximately one-half the keying period.

The relatively long radio pulse waves generated by the transmitter 14 are fed through a coaxial line 21 to a directive radiator 22, represented as a parabola. Associated with the coaxial line 21 are a TR box 23 which prevents the high powered transmitted pulses from entering the receiver circuits and an RT box or anti TR box 24 which prevents any of the weak received signals from returning to the transmitter 14 and being lost therein. If the length of transmission line from the RT or ATR box 24 to the T joint adjacent the antenna is a multiple of a half wavelength, then when the transmitter is off, the RT switch 24 gap will be an open circuit, which is reflected to the T joint of the transmission line as an open circuit, thereby channelling received signals to the RF amplifier 15. The radio frequency energy is radiated in the form of a beam which when it strikes an object results in a reflection, some reflected energy returning to the radiator 22. The received signals pass through the TR box 23 with little attenuation and are applied to the radio frequency amplifier 15. After amplification, the radio signals are supplied to the mixer 16 to which is also supplied a local oscillator frequency from a local oscillator multiplier 25 over a lead 26. The local frequency on lead 26 always differs by a constant intermediate frequency from the transmitted frequency on lead 27 because both are different harmonics of a basic oscillator frequency which is generated and multiplied in local oscillator multiplier 25.

The output wave of the mixer contains signals corresponding to the received radio signals, merely having been translated to a convenient intermediate frequency band. The intermediate frequency amplifier 17 continues the amplification process and supplies the amplified waves to a second detector 31 into which is also introduced a reference intermediate frequency wave from the local oscillator multiplier 25 over a lead 28.

The second detector 31 reproduces in the presence of a stationary reflecting object pulse waves shown, for example, at 32 in Fig. 5. These waves are caused by the combined action of the transmitter and receiver keying waves. The duration of the wave 32 depends upon the range of the object. The front edge 33 of the wave 32 represents the moment when the receiver is switched on while the rear edge 34 represents the end of the transmitted pulse wave. The time required for the transmitted pulse wave to travel to the reflecting object and return results in a delay in the returned wave relative to the transmitted wave as illustrated, for example, by pulse wave 35 in Fig. 4. This delay causes a portion of the returned wave to arrive after the receiver has been made sensitive. Therefore, the width of the resultant pulse wave 32, shown in Fig. 5, or the phase of the fundamental component of this pulse wave relative to the keying wave is a measure of the distance to the object. Although the width of the pulse waves due to stationary objects is a function of the distance, it is to be noted that the periodicity of the pulse waves remains unchanged, merely the number and amplitude of the harmonics being altered. These pulse waves, therefore, contain only the fundamental and higher harmonics of the keying frequency.

A reflection from a moving object, for example, at the same range as the stationary object represented by the wave form 35 of Fig. 5 is shown at 36 in Fig. 6. Here it is to be observed that the wave 36 consists of a Doppler beat note due to the relative motion of the object which note is modulated or keyed at the keying frequency and higher harmonics. The lowest and largest components in the wave 36 shown in Fig. 6 are the Doppler frequency and the Doppler frequency plus the fundamental of the keying frequency and the Doppler frequency minus the fundamental of the keying frequency.

The waves detected in the second detector 31 are impressed upon a band-stop filter 37 which is designed to suppress the fundamental of the keying frequency and its harmonics. Thus, no signals due to substantially stationary objects are transmitted by the filter. On the other hand, signals due to objects having substantial radial velocities are freely passed by filter 37 since these signals do not contain the keying frequency.

Signals that pass through filter 37 are applied to a full wave rectifier 38. The action of rectifier 38 on the wave 36 of Fig. 6 is illustrated at 39 in Fig. 7. The negative half of the wave 36 is inverted and the resultant wave may be seen to comprise the fundamental keying frequency, the fundamental keying frequency plus and minus twice the Doppler frequency and many other higher harmonics and combinations. A very narrow band-pass filter 41 is connected to the output circuit of rectifier 38 to eliminate substantially all frequency components except the fundamental keying frequency which is shown by wave 42 in Fig. 8. The phase of this fundamental component wave is dependent upon the distance to the moving object.

An amplifying and clipping circuit 43 is connected to the narrow band-pass filter 41 to convert the fundamental wave 42 issuing from the filter 41 into a square wave 44 shown in Fig. 9. A pulse wave generator 45 attached to the amplifier clipper 43 differentiates this square wave 44 to produce sharp pulse waves 46 as indicated in Fig. 10. These pulse waves 46 are applied to a cathode ray indicator 47 for the purpose of intensifying the electron beam therein. The beam is swept across the indicator face by a linear sweep circuit 48 which is controlled by the wave 19 supplied over a lead 49 from the keyer 11. The position of an intensified image on the indicator face is accordingly representative of the time delay between the transmitted pulse wave and received pulse wave or, what is equivalent, to the distance to the reflecting moving object.

The indicating circuit is responsive to the amplitude and phase of the substantially sinusoidal wave which is transmitted by the narrow band-pass filter 41. The indicator 47 is thus capable of giving a true distance indication of only one object at a time. When two objects are simultaneously within the radiation pattern of the system, two sine waves having amplitudes dependent upon many factors including the amount of reflected energy returned from the respective objects and phases dependent only upon the distance to the objects are combined in the indicating circuit to yield an image on the screen of the indicator 47 whose position fluctuates according to the varying resultant of the two variable component waves. This effect is minimized by providing a highly directive radiant beam.

The ultimate sensitivity of the radio receiver is determined, as in all electrical systems, by the ratio of the strength of the desired signal to the strength of the interfering noise impressed on the indicator 47. The present inventors have been able to demonstrate by mathematical analysis and confirm by experimental investigation that the noise disturbances present in the indicating circuit consist of, first, a continuous frequency spectrum of random noise potentials and, second, a periodic noise wave having a frequency equal to the fundamental of the keying wave. The random noise has an average interference power proportional to the frequency band width of the narrow band-pass filter 41. The periodic noise wave arises in rectifier 38 as a result of the square wave envelope impressed by the intermittent operation of the receiver on the noise transmitted through band-pass filter 37. The phase of the periodic noise wave is substantially the same as the phase of a wave caused by a hypothetical moving object at a range corresponding to a transit time delay of one-half the period of the keying wave.

This periodic noise wave adds vectorially with the desired signal and tends to produce a range error in the measurement of the indicator 47 unless cancelled according to the teachings of the present invention. The power ratio of the periodic noise relative to the random noise is directly proportional to the keying frequency of keyer 11 and inversely proportional to the frequency band width of the narrow band-pass filter 41. It is evident that when, as is usual, the receiver keying frequency is appreciably greater than the band width of the filter 41, the periodic noise contributes much more interference in the indicating circuit than does the random noise and the former disturbance is the primary factor in determining the weakest signal to which the radio system can satisfactorily respond.

A further characteristic of this periodic noise disturbance is that because the rectifier 38 operates as a linear detector, the noise tends to be suppressed when a signal is present. The magnitude of this noise wave changes with the strength of the signal from a moving object. The range error of a moving object, therefore, varies according to the fluctuation in amplitude of the reflection from the object. This variation in error appears as an irregular movement of the image on the indicator screen.

The constant frequency and phase of the periodic noise wave permits its cancellation by an artificial signal of the same frequency, opposite phase, and equal amplitude. It is necessary, however, to introduce the artificial signal before the rectifier 38 in order that the amplitude of the noise cancelling voltage vary in unison with the amplitude of the periodic noise wave. In practice, the required noise cancelling signal is provided by introducing a wave of one-half the keying frequency into the receiver circuit at the input to the band-stop filter 37.

A suitable wave is derived by a frequency divider 51 under the control of the keyer 11 which applies a control wave over lead 30 having the shape of the transmitter keying wave 18 shown in Fig. 2. The frequency divider 51 may be of the familiar Eccles-Jordan type of trigger circuit arranged to divide the frequency of the applied wave by factor of two. Divider 51 generates an unsymmetrical wave shown in Fig. 11 producing a pulse wave 53 corresponding to every alternate transmitter keying cycle. The time constant of the circuit is arranged sufficiently great so that the bias on the non-conducting electron tube is still too negative after one pulse wave 53 has been generated to discharge until after the next control pulse wave 18 has been applied over lead 30. Only when the second succeeding pulse wave 18 is impressed on the circuit has the negative bias on the non-conductive tube returned to a potential low enough to permit the tube to be triggered and produce another output pulse wave 53. The rectangular wave 53 thus generated has a fundamental component shown at 54 in Fig. 12 whose peak coincides with the middle of alternate transmitter keying pulse waves 18.

An amplitude control 55 permits adjustment of the output wave from divider 51 such as to yield maximum noise cancellation. The noise cancelling signal is applied from control circuit 55 over lead 56 to filter 37. Since the noise cancelling wave is one-half the repetition frequency, it freely passes through filter 37, is converted to the keying frequency by full-wave rectifier 38, and accompanies the desired signal through the narrow band-pass filter 41.

The action of the full wave rectifier 38 is to invert the negative half cycles of the wave 54 as shown by dashed lines 57 in Fig. 12. The fundamental frequency of this full-wave rectified sine wave is illustrated by wave form 58 in Fig. 13. This wave 58 is twice the frequency of the original wave 54 applied to the full-wave rectifier 38 and is, therefore, equal to the keying frequency. The wave 58 is seen to be in phase opposition with the interfering periodic noise wave shown by dashed line 59 and is entirely suitable to balance it out leaving only random noise in the indicating circuit.

A further advantage of introducing the noise cancelling wave before the filter 37 is that any change in the transmission characteristics of the filter will act on the noise cancellation signal in a manner similar to the action of this circuit on the periodic noise wave, thus assuring that the cancellation wave undergoes the same amplitude and phase fluctuations as are introduced in the noise wave which is to be cancelled. The filter 37 further eliminates all but the fundamental and third harmonic of the noise cancelling wave.

In order to aid the understanding of the operation of the present invention, some of the design factors involved in a practical system are now discussed. In one specific radio system embodying the invention, 750 megacycles was chosen for the carrier frequency. At this carrier frequency, a velocity of one mile per hour toward the radio system produces a Doppler beat note of approximately two and one-quarter cycles per second. A repetition rate or keying frequency of 1,000 cycles per second permitted the receiver to respond to objects moving at speeds ranging from very low velocities to over 400 miles per hour without overlapping the Doppler frequency band with the keying frequency. At this repetition rate, the distance corresponding to maximum sensitivity of the receiver, where the delayed reflected wave coincides with the receiver keying wave, is approximately forty-six miles. A satisfactory width for the radiant beam was found to be about eight degrees between half-power angles and 100 watts of peak transmitting power gave the system ability to pick up moving aircraft at ranges up to sixty miles over terrain which yielded strong reflections from stationary objects.

The band-pass filter 41 was designed to have very high attenuation, say 80 decibels, and included a low-pass filter which greatly attenuated all frequencies above those which the filter was designed to pass. The noise rejection band pass filter 41 was tuned to a thousand cycles per second and had a band width of only about four cycles per second. Not only were the filters stable in their characteristics but the phase shift throughout the pass bands was arranged to be such that a moving object at a particular range was indicated at substantially the same position on the screen of indicator 47 irrespective of any variation in its radial velocity.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, means for producing a series of pulse signals, keying means coupled to said first-named means for alternately activating and de-activating said first-named means at a predetermined frequency, a band-stop filter coupled to the output of said first-named means for suppressing signals having frequencies substantially equal to the fundamental of said predetermined frequency, a full wave rectifier coupled to the output of said band-stop filter, a band-pass filter coupled to the output of said full wave rectifier for passing signals having a frequency substantially equal to the fundamental of said predetermined frequency, a generator coupled to the output of said keying means for producing a signal having one-half the frequency of said predetermined frequency, and means coupling the output of said generator to the input of said band-stop filter.

2. In a receiver for receiving pulse modulated radio frequency waves, the combination of phase detecting means for producing pulse signals in response to the radio frequency signals received thereby, a keying signal generator, means coupling the output of said keying signal generator to said detecting means for alternately activating and de-activating said detecting means in synchronism with the signal produced by said keying signal generator, a band-stop filter coupled to the output of said detecting means for suppressing signals having frequencies substantially equal to the fundamental of the signal produced by said keying signal generator, a full wave rectifier coupled to the output of said band-stop filter, a band-pass filter coupled to the output of said full wave rectifier for attenuating all signals except those having a frequency substantially equal to the fundamental of the signal produced by the keying signal generator, a frequency divider coupled to the output of said keying signal generator for producing a signal having one-half the frequency of and having substantially the same wave form as the signal produced by the keying signal generator, and means for coupling the output of said frequency divider to the input of said band-stop filter.

3. The apparatus of claim 2 further including means for controlling the magnitude of the signal produced by said frequency divider.

4. The apparatus of claim 2 further including indicating means coupled to the output of said band-pass filter.

5. In combination, transmitting means for radiating electromagnetic energy toward reflecting objects, receiving means including a phase detector for receiving and detecting electromagnetic energy reflected from said objects, a keying signal generator coupled to said transmitting means and to said receiving means for alternately activating the transmitting and receiving means, a band-stop filter coupled to the output of said receiving means for suppressing signals having frequencies substantially equal to the fundamental of the signal produced by said keying signal generator, a full wave rectifier coupled to the output of said band-stop filter, a band-pass filter coupled to the output of said full wave rectifier for passing signals having a frequency substantially equal to the fundamental of the signal produced by said keying signal generator, generator means coupled to the output of said keying signal generator for producing a signal of one-half the frequency of the signal produced by said keying signal generator, and means coupling the output of said generator means to the input of said band-stop filter.

6. The apparatus of claim 5 further including indicating means coupled to the output of said band-pass filter and to the output of said keying signal generator for comparing the phase difference between the electromagnetic energy pulses received by said receiving means and the electromagnetic energy pulses radiated by said transmitting means.

WILLIAM W. HANSEN.
EDWARD J. BARLOW.

REFERENCES CITED

The following references are of record in the file of this patent:

UNITED STATES PATENTS

| Number | Name | Date |
| --- | --- | --- |
| 1,487,451 | Farrington | Mar. 18, 1924 |
| 1,894,656 | Barons | Jan. 17, 1933 |
| 2,055,883 | Terry | Sept. 29, 1936 |
| 2,222,739 | Bole | Nov. 26, 1940 |
| 2,227,057 | Blumlein | Dec. 31, 1940 |
| 2,310,692 | Hansel | Feb. 9, 1943 |
| 2,402,464 | Suter | June 18, 1946 |
| 2,406,316 | Blumlein et al. | Aug. 27, 1946 |
| 2,407,000 | Evans | Sept. 3, 1946 |
| 2,408,742 | Eaton | Oct. 8, 1946 |
| 2,423,088 | Earp | July 1, 1947 |
| 2,424,263 | Woodyard | July 22, 1947 |
| 2,446,244 | Richmond | Aug. 3, 1948 |
| 2,479,568 | Hansen | Aug. 23, 1949 |